June 21, 1966

A. T. GIBSON 3,257,647

DATA STORAGE DEVICES

Filed June 15, 1962

2 Sheets-Sheet 1

United States Patent Office 3,257,647

Patented June 21, 1966

3,257,647

DATA STORAGE DEVICES

Anthony Thomas Gibson, Tilehurst, Reading, England, assignor to Electric & Musical Industries Limited, Hayes, England, a company of Great Britain Filed June 15, 1962, Ser. No. 202,782
Claims priority, application Great Britain, June 23, 1961, 22,749/61
2 Claims. (Cl. 340—174)

Figure 1:
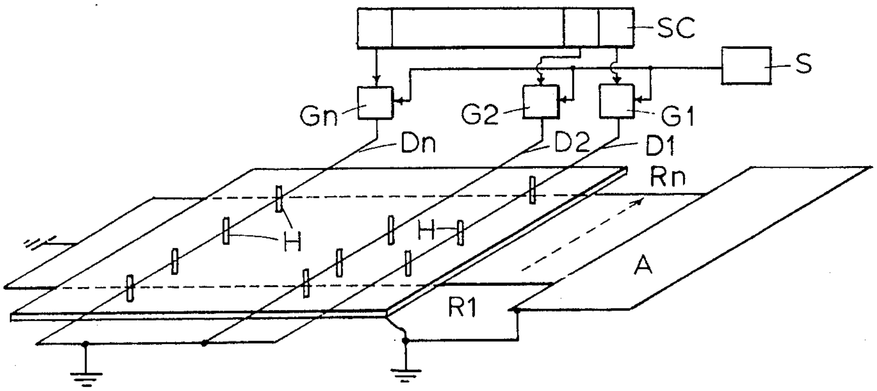

This invention relates to information handling apparatus and information storage members therefor.

The invention relates especially though not exclusively to the storage of information in digital code form.

In digital computers, and other types of information handling apparatus it is often essential to provide storage for digital information. A common form of storage employs magnetic cores arranged in a so-called magnetic core matrix, and this type of storage is used especially for the storage of information which may have to be changed frequently. Punched cards are moreover often used as storage members for information to be fed to the computer or for output information from the computer. However it is sometimes required to provide storage facilities for information which need not be changed very often, and evidently it is desirable that such facilities be less expensive than magnetic core matrixes or the mechanism required for reading from or recording on punched cards.

The main object of the present invention is to provide improved electrical information handling apparatus with a view to fulfilling the above mentioned desideratum.

According to the present invention there is provided information handling apparatus comprising a drive conductor, an output conductor spaced from said drive conductor, a storage member disposed in proximity to said drive conductor and said output conductor, said storage member having conducting and nonconductive areas, means for applying current to said drive conductor, said storage member being disposed so that current applied to said drive conductor induces current in a conductive area of said storage member the boundary of which is such that current is induced in turn in said output conductor, which last mentioned current would not be induced in the absence of said storage member.

According to one form of the present invention, the apparatus may comprises a series of substantially parallel drive conductors disposed in one plane, and a series of output conductors disposed in another plane and extending in a direction which is substantially at right angles to the drive conductors. The storage member in this form of the invention may comprise a conductive lamina disposed between the drive conductors and the output conductors and in a plane parallel to the aforesaid planes, the lamina being earthed preferably being connected to the earth of the amplifiers for the output signals. In this form of the invention, a digit storage location or storage element is provided at each point where a drive conductor crosses an output conductor, so that the storage locations are arranged in rows and columns as they are in one plane of a magnetic core matrix. As the drive conductors and storage conductors are mutually at right angles there is substantially no magnetic coupling between them so that current induced in any one drive conductor will, apart from the storage member, produce substantially no current in the output conductors. However when the storage member is present eddy current will be induced therein, since as aforesaid it comprises a conductive lamina. Normally however in the absence of discontinuities in the lamina, the direction of flow of the eddy current in the lamina will produce no coupling and the lamina will in fact help to screen the output conductors from the drive conductors. However by forming discontinuities selectively at the storage points, in such a way as to alter locally the direction of eddy current induced in the member due to current in one or more of the drive conductors, output currents can be induced in the respective output conductors. For example as will appear subsequently, such output current will be produced if discontinuities in the form of elongated holes are formed, the larger dimension of the holes being oblique to the direction of the drive conductors and the output conductors. Information stored in accordance with this form of apparatus can be selected by arrangements similar to those used for selecting information in magnetic core matrices, the storage member being normally stationary during the reproduction of such information.

In another form of the invention, using a similar storage member, only a single drive wire may be arranged across the series of output wires. In this form of the invention information stored at the storage elements in successive rows may be reproduced by movement of the storage member in a direction perpendicular to the drive conductor. The storage member in this form of the invention then becomes equivalent to a tape or web such as used in a teleprinter or magnetic tape reader.

From the foregoing it will be understood that a nonconductive area on the storage member may take the form of a hole punched through the storage member. Alternatively the storage member may comprise an insulating film, of say paper or plastic, selectively coated with conducting material.

The invention can also be applied to the construction of logical circuits such as used in information handling apparatus. The invention also encompasses storage members such as described above for use in apparatus according to the invention.

The holes punched in the storage member in accordance with the invention may be inclined in different directions to produce currents in the output conductor or conductors of different magnitudes and/or polarities.

Figure 2:
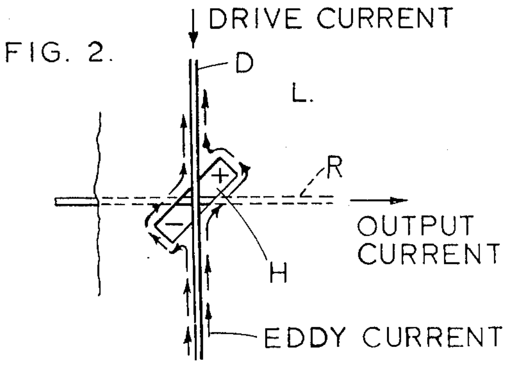
Figure 3:
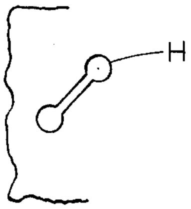
Figure 4:
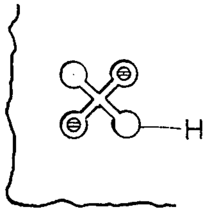
Figure 5:
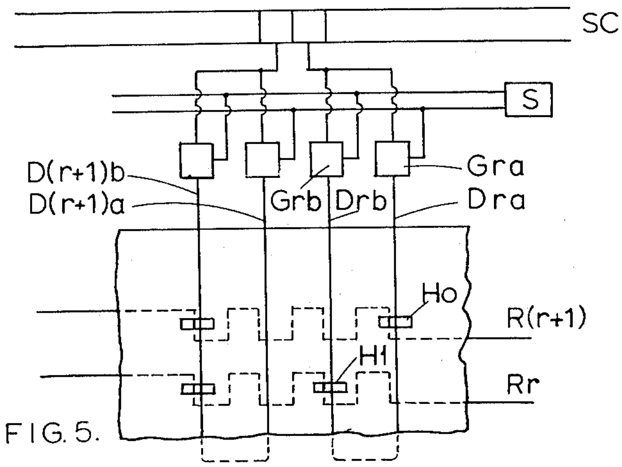
Figure 6:
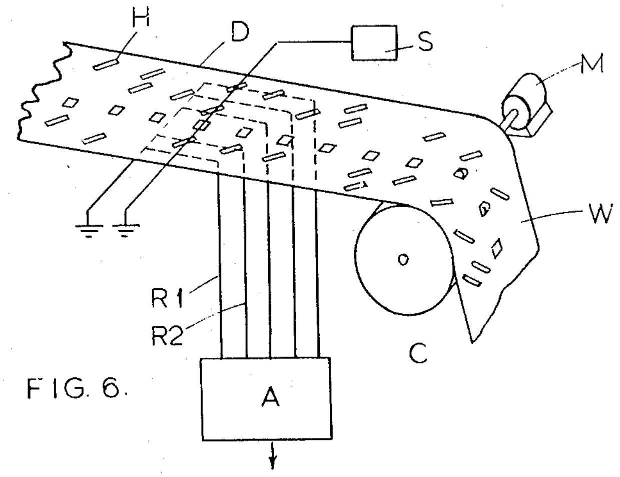
Figure 7:
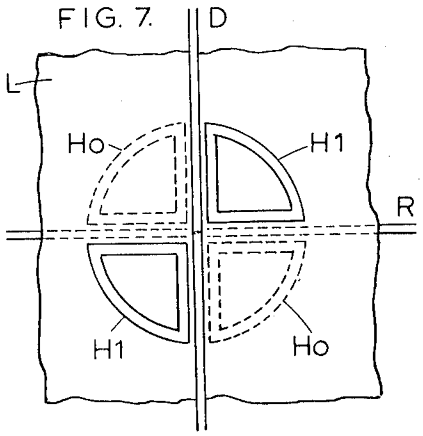
Figure 8:
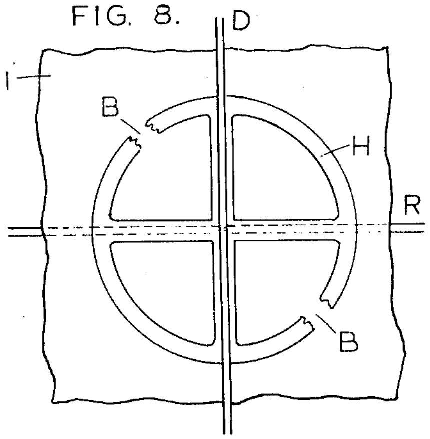

In order that the invention may be fully understood and readily carried into effect it will now be described with reference to the accompanying drawings, of which:

FIGURE 1 represents diagrammatically information handling apparatus according to one example of the present invention, FIGURE 2 is a diagram illustrative of the operation of the apparatus shown in FIGURE 1, FIGURES 3 and 4 represent alternative configurations of holes which may be utilised in storage members according to the present invention, FIGURE 5 shows a modification of FIGURE 1 employing a different arrangement and drive and output conductors, FIGURE 6 illustrates information handling apparatus according to another example of the present invention, and FIGURES 7 and 8 represent further examples of storage members according to the present invention comprising shaped conductive elements on nonconductive layers.

Referring to FIGURE 1, the apparatus illustrated comprises a series of drive wires D1 to D$n$ which are arranged parallel to one another in a plane parallel to that occupied by a storage member L. The storage member in this example is a conductive lamina having holes punched through it to represent digits of stored information. Output wires R1 to R$n$ are arranged parallel to one another and to the lamnia L on the opposite side thereof from the drive wires D. The drive wires D are earthed at one end as indicated, and connected at their other ends to the output terminals of respective gates G1 to G$n$. Each gate has two input terminals, one connected to a source of drive current S. The source S may be an oscillator or pulse source. The other input terminal of each gate is connected to a respective output terminal of a selector circuit SC which may be a shift register, decoding tree or other means of selectively enabling gates G to feed current from the source S to one of the drive wires D. The lamina L carries holes H which are in the form of elongated rectangles located to register with selected points where the drive wires D cross the output wires R, the longer dimensions of the holes being at approximately 45° to both the drive wires D and the output wires R. The holes represent stored information in the same way as in punched cards each row of storage elements representing for example one word or item of information. Moreover a hole may represent a binary digit of value 1 and the absence of a hole may represent a binary digit of value 0.

In order to explain the principle of the invention, FIGURE 2 shows one of the rectangular holes H in the lamina L and the associated drive wire D and output wire R. When oscillatory current is fed to the respective drive wire D from the source S, eddy current is induced in the lamina L which tends to flow in the reverse direction but parallel to the current in the drive wire D. In view of the close proximity of the wire D to the lamina L the eddy current is restricted to a very small area close to the drive wire D. However when the eddy current encounters the discontinuity in the conducting lamina formed by the hole H, the current is constrained to flow round the hole in the manner shown by the dotted lines I. The eddy current flows along both ends of the hole H and a magnetic field is induced within the hole the lines of force of which at any instant have opposite directions at the opposite ends of the hole. Moreover because of the inclination of the hole H to the output wire R the magnetic flux produced near the hole by the eddy current links with the output wire and so induces an output signal therein. Clearly, if no drive current is fed to the wire D or if the hole H is not present, no output signal would be produced. Therefore the lamina L in which the oblique holes H are punched to represent digital information may be interrogated to reproduce that information by applying oscillatory or variable current to the drive wires D in a desired order. The output signals are fed to a utilisation circuit, such as the arithmetic organ of a digital computer. The utilisation circuit is represented by the outline A. It will be assumed to include initial amplifiers, one for each wire R, which have a common earth terminal connected to the lamina L and the end adjacent the output end of the wires R.

In the description of FIGURE 1, it is assumed that the holes constitute a binary digital code representation of the stored information. However a hole H disposed at right angles to that shown in FIGURE 2 would induce an output signal in the output wire R of opposite polarity to that induced by a hole having the orientation shown. Because of this, the invention lends itself to the storage of information in a ternary code. Alternatively output signals of opposite polarity may be used to represent the two values of a binary digit, thus providing better discrimination between the two digit values.

The invention allows large stores having a faster access time to be produced since the drive and output wires can be made low impedance matched lines, and no limitation is induced by the use of magnetic or dielectric materials in the storage elements. Moreover noise is maintained at a low value by the storage member itself which acts as a screen between the drive and output wires.

Holes of other shape than that represented in FIGURE 2 may be used. For example the storage member may carry holes of dumbbell shape, which provide more efficient coupling to the output wires than rectangular holes.

Alternatively holes of crossed dumbbell shape such as shown in FIGURE 4 may be employed and in this case the value of the digit in the respective place may be represented by putting ferrite slugs F in one or other of the dumbbells. This facilitates entry of information by a plug-board technique.

Moreover other arrangements of the drive and output wires are possible in accordance with the invention. One such other arrangement is shown in FIGURE 5. In this modification of the arrangement shown in FIGURE 1, a pair of drive wires is provided for each row of digital storage elements. The drive wires of one pair are represented by the reference D*ra* and D*rb* and wires of another pair are represented by the references $D(r+1)a$ and $D(r+1)b$. Moreover the source of drive current S in this case is arranged to provide push pull outputs which can be applied selectively by gates such as G*ra* and G*rb* to the drive wires of each pair. The gates which are enabled to transmit the drive current from the source S are as in FIGURE 1 selected by a circuit SC. Moreover, in this modification of the invention each of the output wires is of zig-zag form such as represented in the case of the wires Rr and $R(r+1)$. Thus a short portion of each output wire is parallel to each of the drive wires. The conducting lamina as in the case of FIGURE 1 is disposed between the drive wires and the output wires and a digit of one value is represented by a rectangular hole such as represented by H1 located so as to produce coupling from one of the respective pair of drive wires to the output wire. A digit of the other value is produced by a hole such as H0 disposed to produce coupling from the other drive wire to the output wire. In this modification of the invention coupling is produced by the presence of a hole between portions of wire which are parallel and therefore the holes in the lamina L need not be oblique. A hole therefore produces a greater amount of coupling than in the case of FIGURE 1 and this facilitates the discrimination between output signals and spurious signals.

The form of the invention shown in FIGURE 6 is arranged to reproduce information which is stored in the form of a web or tape W analogous to a teleprinter tape. Each item of information is stored by means of a row of holes, or discontinuities, on a conductive tape W. The holes are oblique as in the case of the arrangement shown in FIGURE 1 and only a single drive wire D is required to cooperate with the output wire R1 to R*n*. The drive wire may be continuously excited by current from the source S and output signals are produced when respective rows of holes on the tape W are aligned with the drive wire D. C represents a roller for transporting the tape W, the roller being driven by a motor M. The tape may be driven continuously or intermittently, and instead of energising the drive wire D continuously it may be intermittently energised and at times when a row registers therewith, such intemittent application of drive current to the wire D being synchronised with the tape transport mechanism.

It will be understood that the arrangement shown in FIGURE 6 may be modified in the manner corresponding to that represented by FIGURE 5.

Another alternative example to that shown in FIGURES 1 and 2 is shown in FIGURE 7. In this example the member L is of insulating material with the drive conductor D and read conductor R on opposite sides of it, and loops H1 of conducting material are placed on the surface of the member L. In the absence of the loops H1 there is substantially no inductive coupling between the conductors D and R because they are perpendicular to one another. However, because part of the loops H1 lies parallel to the drive conductor D, the drive current in the conductor D induces currents in the loops H1, which in turn, because another part of the loops lies parallel to the read conductor R, induces a signal in the conductor R. The polarity of the signal induced in the conductor R depends on which quadrants relative to conductors D and R the loops H1 lie in. The dotted loops H0 show the alternative position for the loops so that signals are induced in conductor R of polarity opposite to those due to the loops H1. Of course, a single loop H1 or H0 would suffice to provide inductive coupling between the conductors D and R.

The loops H0 and H1 may conveniently be produced by printed circuit techniques but a separate pattern must be produced for each member L requiring a different arrangement of couplings between the drive and read conductors, which could be inconvenient. In order to overcome this difficulty, the arrangement shown in FIGURE 8 may be used. In this case each element H is printed in the same form, a circle with two perpendicular diameters, of conducting material. The sense of the coupling is then determined by removal of conducting material from diametrically opposite portions of the ring, as shown at B in the figure, leaving only two diagonally opposite circuits complete. The removal of conducting materials at the points B may conveniently be carried out by drilling or punching out the member L. Alternatively the material may simply be scraped away by hand.

The invention is not confined to the applications which have been illustrated in the drawing. It may be applied to the construction of logical circuits for evaluating logical functions in a digital computer. The simplicity of arrangements according to the invention coupled with the screening which is produced by the storage member itself renders it suitable for high frequency operation in miniature circuits.

What I claim is:

1. An information storage device comprising a set of input conductors, a set of output conductors, each input conductor having first elements formed to be inductively coupled to elements of respective output conductors in one sense and second elements formed to be inductively coupled to elements of respective output conductors in the opposite sense, each pair of first and second elements of an input conductor at which coupling may exist to the same output conductor constituting a storage location and a conducting sheet disposed between said input conductors and said output conductors, said sheet having a single hole at each storage location, each hole being so placed in relation to the respective elements to enable coupling between the respective input conductor and output conductor in a selected sense and said sheet disabling coupling between said respective input and output conductors in the opposite sense.

2. An information storage device comprising a plurality of input conductors, a plurality of output conductors, each input conductor having a plurality of pairs of first and second portions that lie parallel and in proximity to portions of output conductors respective to the pairs, said first portions tending to provide inductive coupling between input and output conductors in one sense and said second portions tending to provide inductive coupling between input and output conductors in the opposite sense, each pair of portions of an input conductor and associated portions of an output conductor forming a storage location, and a conducting sheet disposed between said input conductors and said output conductors, said sheet having a single hole at each storage location so placed in relation to said input and output conductors as to allow inductive coupling between each input conductor and each output conductor in a selected sense only.

References Cited by the Examiner

UNITED STATES PATENTS

| | | | |
|---|---|---|---|
| 2,964,740 | 12/1960 | Hense | 340—174 |
| 3,003,143 | 10/1961 | Beurrier | 340—173 |
| 3,027,548 | 3/1962 | Vaughan | 340—174 |
| 3,060,411 | 10/1962 | Smith | 340—174 |
| 3,061,821 | 10/1962 | Gribble et al. | 340—174 |
| 3,102,999 | 9/1963 | Bernemyr et al. | 340—174 |

OTHER REFERENCES

Gahran, H. C., and Wamsley, J. G., Ternary Read Only Memory. IBM Technical Disclosure Bulletin, vol. 4, No. 5, October 1961, pages 38 and 39.

Bruce, C. D., and Shortle, J. K., High Speed Reader. IBM Technical Disclosure Bulletin, vol. 4, No. 1, June 1961, page 4.

IRVING L. SRAGOW, *Primary Examiner.*

M. K. KIRK, H. D. VOLK, *Assistant Examiners.*